United States Patent [19]

Bertling et al.

[11] 4,428,623
[45] Jan. 31, 1984

[54] BRAKE FORCE AMPLIFIER FOR A MULTIPLE CIRCUIT BRAKE SYSTEM

[75] Inventors: Hannes Bertling, Vaihingen; Heinz Leiber, Leimen, both of Fed. Rep. of Germany

[73] Assignee: Robert Bosch GmbH, Stuttgart, Fed. Rep. of Germany

[21] Appl. No.: 276,127

[22] Filed: Jun. 22, 1981

[30] Foreign Application Priority Data

Jun. 27, 1980 [DE] Fed. Rep. of Germany ....... 3024184

[51] Int. Cl.³ ............................................ B60T 13/14
[52] U.S. Cl. .................................... 303/114; 303/119
[58] Field of Search ............... 303/119, 114, 116, 113, 303/117, DIG. 1, 115, 111, 6 R, 10–12, 13, 92, 61–63, 68–69; 188/181 A, 181 R, 345

[56] References Cited

U.S. PATENT DOCUMENTS

| | | | |
|---|---|---|---|
| 3,503,655 | 3/1970 | Heimler | 303/114 |
| 3,514,161 | 5/1970 | Frayer | 303/117 |
| 3,702,713 | 11/1972 | Oberthur | 303/117 |
| 3,827,759 | 8/1974 | Belart | 303/114 |
| 4,264,109 | 4/1981 | Knox et al. | 303/119 X |

FOREIGN PATENT DOCUMENTS

| | | | |
|---|---|---|---|
| 3024184 | 1/1982 | Fed. Rep. of Germany | 303/114 |
| 2327124 | 5/1977 | France | |
| 1268932 | 3/1972 | United Kingdom | 303/116 |

*Primary Examiner*—Douglas C. Butler
*Attorney, Agent, or Firm*—Edwin E. Greigg

[57] ABSTRACT

A brake force amplifier for a multiple-circuit brake system. The brake force amplifier has a multiple-circuit brake valve, parallel to which a switching valve is provided. This switching valve is actuated by a main cylinder pressure in exactly the same manner as the brake valve. When there is no pressure available in a presurizing apparatus supplying the brake force amplifier with pressure medium, the switching valve keeps the brake valve ineffective. When a brake force amplifier of this kind is used in an anti-skid apparatus, an apparatus is created which has lower cost, lower weight and a smaller structural volume than known designs and the function of which is improved in terms of noise and retroactive effect on the pedal. The brake force amplifier is intended for a multiple-circuit brake system for motor vehicles.

5 Claims, 2 Drawing Figures

BRAKE FORCE AMPLIFIER FOR A MULTIPLE CIRCUIT BRAKE SYSTEM

BACKGROUND OF THE INVENTION

The invention is based on a brake force amplifier for a multiple-circuit brake system for motor vehicles. A brake force amplifier of this kind is known (French laid-open application No. 23 27 124).

This known brake force amplifier does permit the uniform actuation of the brake valves; however, its application in anti-skid apparatuses is not provided for.

OBJECT AND SUMMARY OF THE INVENTION

The brake force amplifier has the advantage over the prior art that it is particularly well-suited for use in an anti-skid apparatus. The advantages of this brake force amplifier are as follows: the functioning of the anti-skid means has only a limited retroactive effect on the brake pedal; no damage to the main cylinder sleeve can occur; lower demands are made in terms of output of the pressurizing apparatus; the amplification of brake force is realizable in the anti-skid apparatus without undergoing additional costs; and, finally, a limitation of pressure is attainable in a simple manner and great elasticity of the wheel brake cylinders can be permitted.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
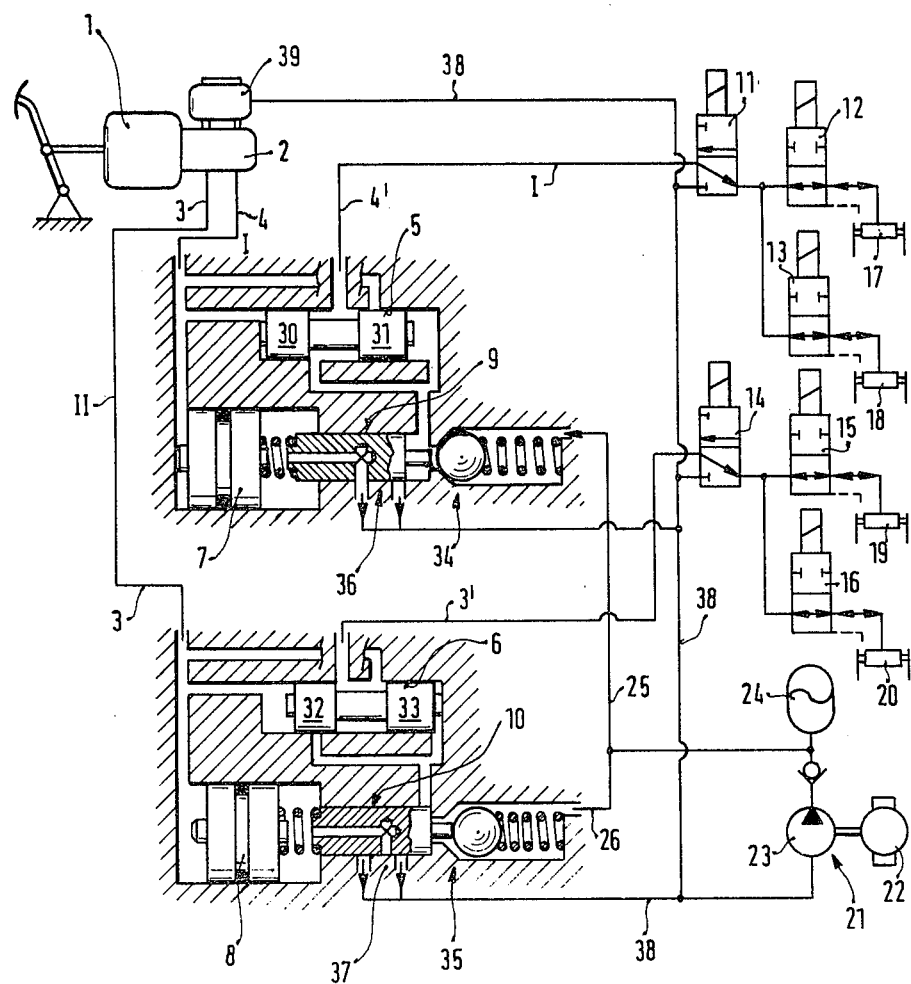
FIG. 1 generally shows a schematic view of a first embodiment of the brake force amplifier with valves which are part of an anti-skid apparatus.

A brake force amplifier 1 is incorporated, together with a two-circuit main cylinder 2, into a brake system. However, the two elements 1 and 2 may also be disposed separately from one another. Two conduits 3 and 4 of two brake circuits I and II begin at the brake amplifier 1 and lead via respective switching slide valves 5 and 6, respective travel simulators 7 and 8, and respective brake valves 9 and 10 as well as a number of magnetic valves 11, 12, 13, 14, 15, 16 to brake cylinders 17, 18, 19 and 20. The elements numbered 1 through 10 comprise a unitized construction.

A pressurizing system 21 is also provided, which is substantially made up of an electromotor 22, a pump 23 and a reservoir 24 and is connected via two pressure lines 25 and 26 to the brake force amplifier 1.

Each switching slide valve 5 and 6 has two enlargements 30, 31 and 32, 33, respectively and more or less resemble spool valves. One of each of these pairs of enlargements (30 and 32, respectively) is subjected to the pressure of the main cylinder, while the other (31 and 33, respectively) is subjected to the pump pressure via lines 25 and 26 imposed via the brake valve 9 and 10, respectively. The spool valves 30, 31 and 32, 33, acting in the manner of a slide, control a connection of one brake output line 3' or 4', respectively, with the brake valve 9 or 10, respectively, or with the brake line 3 or 4.

Each brake valve 9 and 10 has a ball-type inlet valve 34 and 35 and a slide-type outlet valve 36 and 37. The ball-type inlet valve 34 and 35 which operates against the force of a travel-limiting spring monitors a connection between the pressure line 25 or 26 and the switching slide valves 5, 6. The slide-type outlet valve 36 and 37 controls a connection between the switching slide valves 5 or 6 and a return flow line 38, which leads to a refill container 39 of the main cylinder 2.

It should be noted that the refill container 39 is that of a conventional main cylinder 2, which is provided with an additional aperture for connecting the return flow line 38, and that the anti-skid apparatus furnishes its working fluid to this refill container. Mode of operation:

During normal braking and when the pressurizing system 21 is intact, the two switching slide valves 5 and 6 are in the position such as is shown in the drawing for the upper switching slide valve 5; that is, they block the passage of the brake fluid from the main cylinder 2 to the wheel brake cylinders 17-20. When the brake pedal is actuated, however, the brake fluid displaces the spring-loaded travel simulators 7 and 8, which are supported on the slides of the brake valves 9 and 10. The brake valves 9 and 10 switch over and permit pressure fluid to flow to the magnetic valves 11-16 and the wheel cylinders 17-20—or from these elements into the return flow line 38—until such time as the forces at the slides of the brake valves 9 and 10 have become balanced. In other words, they permit the flow of pressure fluid until the hydraulic force of the pressure in the system which is exerted on the cross sectional area of the slides is equal to the force of the springs of the travel simulators 7 and 8. It is advantageous in this respect to select the cross sectional areas of the pistons in the travel simulators 7 and 8 such that they are equal to or larger than the cross sectional areas of the slides of the brake valves 9 and 10.

For the functioning of the anti-skid apparatus, one 3/2-way magnetic valve 11 or 14, respectively, is provided per vehicle axle and two 2/2-way magnetic valves 12, 13 or 15, 16, respectively, are provided as maintenance valves for each vehicle wheel. Wheel sensors, not shown, and an electronic switching device, also not shown, for triggering the magnets of the magnetic valves 11-16 are also used in the anti-skid apparatus. An anti-skid apparatus designed in this way is known, and it is very favorable in cost. If conditions so dictate, one 3/2-way magnetic valve and one 2/2-way magnetic valve, or two 2/2-way magnetic valves, may be used instead for each vehicle wheel; in that case, however, the apparatus will be more expensive.

When the anti-skid apparatus is in operation and effects a reduction of pressure in one wheel cylinder 17-20, then because of the specialized design of the brake force amplifier according to the invention this reduction of pressure is either not perceptible, or is hardly perceptible, at the brake pedal. For the same reason, damage to the sleeve of the main cylinder 2 cannot occur. Furthermore, the apparatus makes almost no noise, and the required output of the pressurizing system 21 is very low. The amplification of brake force can be realized with practically no additional costs using the existing anti-skid apparatus. During normal operation, the entire apparatus functions as an external-force brake system. Finally, the apparatus according to the invention has a pressure-limiting function and permits the use of wheel brake cylinders which are relatively elastic. This is possible because the reservoir pressure is imposed via the brake valves.

Because of the principle of the external-force brake, it is possible for the anti-skid apparatus to utilize relatively inexpensive magnetic valves permitting relatively high leakage. Furthermore, the required pressure in the reservoir 24 is independent of the maximum pressure generated in the main cylinder 2 by the driver of the vehicle. Finally, braking can still be effected even if the brake force amplifier 1 fails.

If the pressurizing system 21 fails, then the supply of pressure fluid from the reservoir 24 is suppressed. The switching slide valves 5 and 6 assume their right-hand terminal position and their enlargements 30, 31 and 32, 33, respectively, close the connection between the travel simulators 7 and 8 and the slides of the brake valves 9 and 10. As a result, further movement of the travel simulators 7 and 8 toward the right is prevented. The switching valves 5 and 6 thus keep the brake valves 9 and 10 in an ineffective state.

As a result of the pressure generated in the main cylinder 2 by the driver's foot and because of the absence of the counterpressure at the switching slides 5 and 6 from the direction of the brake valves 9 and 10, the switching valves 5 and 6 are forced to the right, enabling the required connection between the main cylinder 2 and the wheel brake cylinders 17–20.

Figure 2:
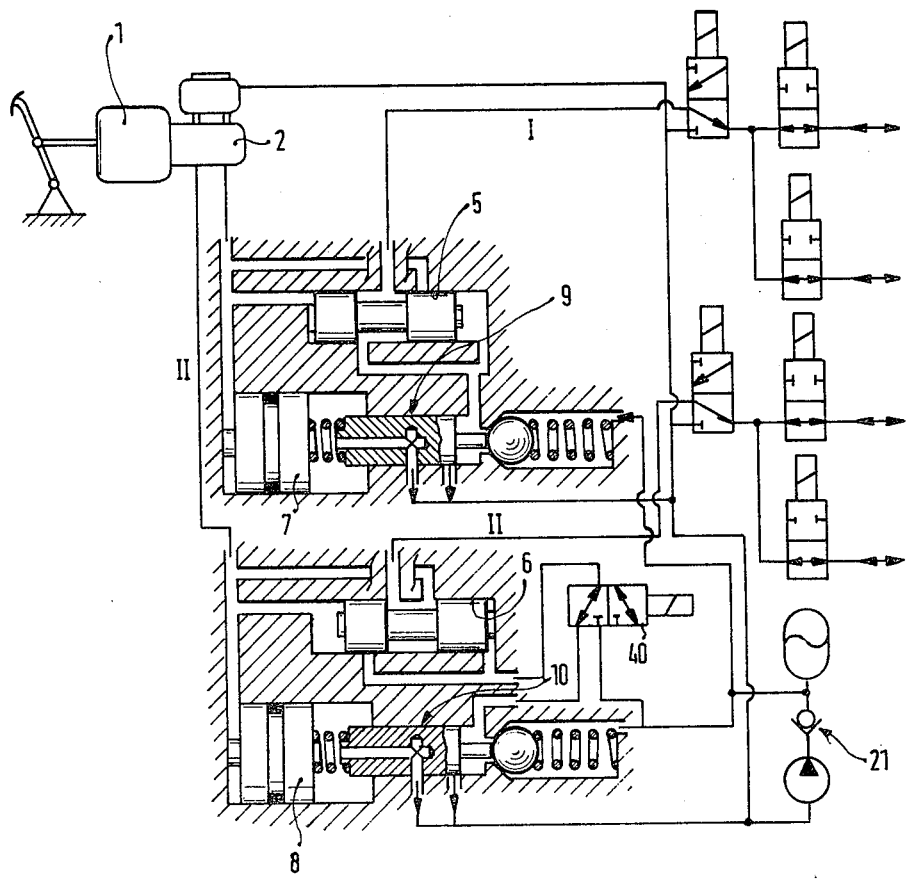
FIG. 2 shows a modification of the structure shown in FIG. 1.

The design of FIG. 2 corresponds in essence to that of FIG. 1, with the exception that in FIG. 2 a further 3/2-way magnetic valve 40 is used. This magnetic valve 40 is inserted into the brake circuit II, which normally serves the driving axle, that is, the rear axle. However, it is also possible to use two such valves 40 if the brake circuits are set up diagonally. As a result, the hydraulic portion of a propulsion control system can be realized such that the valves 40 impose a braking pressure even before the driver performs braking.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A brake force amplifier for a multiple-circuit brake system for motor vehicles, including a main cylinder, a multiple-circuit brake valve actuatable by fluid pressure from said main cylinder, said valve further arranged to effect an amplification in brake circuits which is proportional to the main cylinder pressure, a pressurizing system substantially comprising a pump and a reservoir for supplying fluid under pressure to said main cylinder, a switching valve provided in parallel to the multiple-circuit brake valve, said switching valve being actuatable by the main cylinder pressure and arranged to maintain said multiple-circuit brake valve ineffective if the pressurizing system has no pressure available for said system, a travel simulator subjected to fluid pressure in at least one pressure line leading from said main cylinder to said multiple-circuit brake valve and said travel simulator is provided with a travel limiting spring valve.

2. A brake force amplifier as defined by claim 1, characterized in that each of said brake circuits, includes a travel simulator.

3. A brake force amplifier as defined by claim 1, characterized in that said switching valve comprises a spool valve.

4. A brake force amplifier as defined by claim 1, characterized in that said brake valve further includes a slide, said slide arranged to serve as a blocking member for said travel simulator.

5. A brake force amplifier as defined by claim 1, characterized in that said brake force amplifier is structurally combined with an anti-skid apparatus comprising magnetic valves.

* * * * *